(12) United States Patent
Shorrock (10) Patent No.: US 7,113,086 B2
(45) Date of Patent: Sep. 26, 2006

(54) SYSTEMS AND METHODS FOR MONITORING ROOM CONDITIONS TO IMPROVE OCCUPANT PERFORMANCE

(75) Inventor: John E. Shorrock, Minneapolis, MN (US)

(73) Assignee: ALTEC Energy Systems, Minneapolis, MN (US)

( * ) Notice: Subject to any disclaimer, the term of this patent is extended or adjusted under 35 U.S.C. 154(b) by 64 days.

(21) Appl. No.: 10/819,021

(22) Filed: Apr. 6, 2004

(65) Prior Publication Data

US 2004/0249479 A1    Dec. 9, 2004

Related U.S. Application Data

(60) Provisional application No. 60/461,274, filed on Apr. 7, 2003.

(51) Int. Cl.
 *G08B 19/00* (2006.01)
(52) U.S. Cl. ............ 340/521; 340/517; 340/522; 340/539.22; 340/539.26
(58) Field of Classification Search ............ 340/521, 340/501, 517, 522, 539.1, 539.22, 539.26, 340/539.27, 3.1
See application file for complete search history.

(56) References Cited

U.S. PATENT DOCUMENTS 5,086,385 A * 2/1992 Launey et al. ............ 700/83

* cited by examiner

*Primary Examiner*—Daryl C Pope
(74) *Attorney, Agent, or Firm*—Robert A. Pajak (57) ABSTRACT

Systems and methods for monitoring conditions in a room are disclosed. Sensors may be placed in a room that measure various environmental conditions of the room, such as temperature, CO2, ventilation, humidity, volatile organic compounds, sound, static, light, pressure and odor (e.g. H2S). Depending on the use of the room, a selected number of these measurements are signal conditioned to be able to be displayed in real time, or near real time, on a computer display monitor or other visual display in a three dimensional format or more called a sweet spot. At the same time the computer can display onto the visual display an optimum sweet spot that is calculated from an algorithm given the special features, contents, and the like that characterize the room. The deviation between lhe two sweet spots, i.e., actual and theoretical, may be calculated, and recommendations made on the visual display that will cause the actual sweet spot to coincide with the algorithm sweet spot. The actions may then be carried out in real time, or near real time, to correct for the unusual conditions in the room.

14 Claims, 5 Drawing Sheets

SYSTEMS AND METHODS FOR MONITORING ROOM CONDITIONS TO IMPROVE OCCUPANT PERFORMANCE

RELATED APPLICATION

This application claims the benefit of priority pursuant to 35 USC 119 of provisional patent application Ser. No. 60/461,274 filed 7 Apr. 2003, the disclosure of which application is hereby incorporated in its entirety by reference herein.

FIELD OF THE INVENTION

The present invention relates generally to systems and methods for monitoring environmental conditions, and more particularly to monitoring room conditions to improve occupant performance in a designated space.

BACKGROUND OF THE INVENTION

Classrooms are the places where most learning takes place. Keeping student attention is very important if teachers are to transfer their information. However the conditions in a classroom are not always conducive to maximum attention. Most classrooms have associated therewith a heating and a cooling system for providing some form of heating for the winter and cooling for the summer, both systems generally being part of a building HVAC System (heating, ventilating, and air conditioning system). The condition of the heating and cooling systems varies greatly depending on age, maintenance, design and installation. In many cases the insides of the school buildings have been modified or changed but the HVAC system has been kept the same.

The efficiency and configuration of an HVAC system for a classroom is not usually monitored because there are typically no monitors in the room. HVAC systems are typically tuned for the system as a whole, i.e. for the entire building or a large zone within the building. A particular room within a building may vary widely from the tuned system. The room usually has a thermostat to control heat but that is about all. What devices that are found in a room are usually sensors that are part of lhe HVAC controls for the room. The HVAC controls send signals to the ductwork control components to mix air to supply the correct temperature and/or to the boiler to adjust the boiler water temperature and corresponding heat output. However conditions in a room are affected by more variables than just temperature.

When people are active in a room the conditions in that room can change considerably. It is not unusual for conditions to exist that cause children to become sleepy created by the CO2 rising when expelled by breathing, and a rise in temperature by a high set thermostat and radiant body heat. Such conditions can quickly destroy the optimum conditions for good predominance and learning and the teacher's moment passes. Because such conditions happen in real time it is hard for the teacher to see that such conditions that negatively impact learning are occurring, and even harder to know how to respond to them because there is no quantitative information in the room to which the teacher can refer.

BRIEF DESCRIPTION OF THE INVENTION

The above-mentioned shortcomings, disadvantages and problems are addressed by the present invention, which will be understood by reading and studying the following specification.

An object of the present invention is to provide and method and system for monitoring environmental conditions in a designated space, indicates environmental conditions in the designated space, and suggests corrective action so as to improve occupant performance on the designated space.

Some embodiments of the invention are focused on a room, especially a classroom. Sensors may be placed in a room that measure various aspects, such as temperature, CO2, ventilation (e.g., air volume, air speed), humidity, volatile organic compounds, sound, static, light, pressure and odor (e.g., H2S). Depending on the use of the room three of these measures are signal conditioned to be able to be displayed in real time, or near real time, on a computer screen or visual display monitor or the like, in a three dimensional format or the like, or more called a "sweet spot." At the same time a computer may display on the visual display an "optimum sweet spot" that is calculated from an algorithm given the special features and contents of the room. The deviation between the two sweet spots can be calculated and recommendations made on the screen. that will cause the actual sweet spot to coincide with the algorithm sweet spot. The actions can be carried out in real time, or near real time, to correct for the unusual conditions in the room. Thus various embodiments of the invention comprise a Sweet Spot Monitor for measuring room conditions for optimum learning performance and maintaining the teaching moment.

The present invention describes systems, methods, clients, servers, and computer-readable media of varying scope. In addition to the aspects and advantages of the present invention described in this summary, further aspects and advantages of the invention will become apparent by reference to the drawings and by the detailed description that follows.

DETAILED DESCRIPTION OF THE INVENTION

In the following detailed description of exemplary embodiments of the invention, reference is made to specific exemplary embodiments in which the invention may be practiced. These embodiments are described in sufficient detail to enable those skilled in the art to practice the invention and it is to be understood that other embodiments may be utilized and that logical, mechanical, electrical, and other changes may be made without departing from the true spirit and scope of the present invention.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here and generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient, at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

For the purposes of this specification, the term "optimum" or "optimal" is not used to necessarily mean "the best", rather it is used to mean "better than that generally available." Additionally, the term "real time" encompasses both real time and near real time, i.e. actions that are not deferred for a substantial period of time.

The various embodiments of the invention monitor conditions in a room or designated space in real time and display those conditions in real time on a visual display such as a computer monitor screen, or the like. For any room there are conditions that are considered optimum and the monitor" allows the optimum conditions to be compared with the actual conditions, and the deviation calculated. To correct the deviation from optimal environmental conditions, a list of recommended actions that may be taken in real time may be listed, i.e., visually displayed or printed. In turn, the teacher and/or occupants and/or maintenance personnel may execute the list of recommended actions if desired.

Environmental conditions in a room are determined by certain parameters. The parameters that can be measured are Carbon Dioxide ($CO_2$), Temperature, Ventilation, Volatile Organic Compounds (VOC's), Humidity, Sound, Light, Pressure, Static, Odor and Fungus. Different rooms or spaces will typically have different optimum conditions, and the optimum conditions can be defined by the major parameters that are considered significant for that room. For example in a general room/classroom/computer room, or the like, optimum conditions will be defined by the major parameters that relate $CO_2$ to temperature to ventilation. Examples of how the parameters relate to different rooms are listed below:

Biology Lab—$CO_2$, Temperature, Humidity

Chemistry Lab—$CO_2$, Temperature, Volatile Organic Compounds

Music Room—$CO_2$, Temperature, Sound level

Physics Lab—$CO_2$, Temperature, Static

Photo Lab/Presentation Room—$CO_2$, Temperature, Light

Gym—$CO_2$, Temperature, Pressure

Changing/Locker room—$CO_2$, Temperature, Odor

Library—Temp, Humidity, Fungus

For a given room the parameters have a given range of desirable values. In some embodiments, these desirable values may be recommended by ASHRAE (American Society of Heating, Refrigerating and Air conditioning Engineers), OSHA (Occupational Safety and Health Administration) and other bodies as values that result in an optimum room condition. In a classroom that is being monitored for $CO_2$, temperature, and ventilation, these parameters can be measured in real time and compared with what the recommended range of values should be for that room. Some embodiments of the invention treat this as a classic three-body problem and results are displayed in a three-body configuration or more if needed. The recommended values form what will be referred to as a "sweet spot," which is the optimum point for good human performance. The actual values are also configured into "a spot" and the two spots compared. If there is a deviation, then recommended actions may be taken to bring the two spots together. Actions that may be recommended include:

(1) Turn on room fan (2) Open a window (3) Pull down a blind (4) Have class move about for 5 minutes (5) Adjust thermostat The above actions are referred to as a "level one" activity, that is, an activity which can be done immediately. If however the spot deviation is far apart, then more serious action, which is referred to as a "level two" activity is required that will involve adjustments to the room HVAC control. In some embodiments, a recommended list of actions at level two that may be displayed that may include such items as:

(I) Increase ventilation, (2) Move furniture away from ducts, and (3) Increase number of vents.

As mentioned previously, the algorithm for a room is defined by the room parameters. in some embodiments, in order that the algorithm better represent the room. adjustments may be made to "fine tune" the algorithm to the room. Such adjustments may include any combination of the following:

(1) What direction is the room facing, (2) How many windows, (3) How many lights, (4) How many students for the lesson in progress, (5) How many computers running, (6) How many fridges running, (7) How many burners, (8) How high are the ceilings, (9) How many fans, or (10) What is the room size?

The information on the various parameters above may be entered into the system to adjust the algorithm to reflect or characterize the particular room. Most changes are a one-time change, for example the number of lights etc. However, some inputs may change as the class changes, for example the number of students. Also, in some embodiments the algorithm may be adjusted so it is sensitive to seasons so that the time of year may need to be entered.

In further alternative embodiments, the various parameters may vary depending on the geographical location. For example, in the northern United States, temperature, ventilation and CO2 levels may be measured. In the southern United States, temperature, humidity, and ventilation may be measured.

In some embodiments, sensors placed on the walls measure the parameters. Each sensor measures one parameter and may be placed according to installation instructions that come with the system. In alternative embodiments, the sensor placement can be determined as positioned in a virtual room displayed on a monitor. In some embodiments, the sensors are easily moved as they may use Velcro to attach to the walls or ceiling. Sensors may be battery powered or main driven and plugged into a standard outlet.

In some embodiments the sensors transmit their signal by RF (radio frequency) or some other means to a central data collection point or computer or signal processor that converts the signal from an analogue form to a digital format. RF or other wireless means of communication allows great flexibility in placing units to allow the best monitoring. However, some embodiments may use wired sensors for communication. From the digital format it is converted to a format that make it compatible to a computer port like a corn port, parallel port, firewire (IEEE 1394) or an USB port. Once communicated to the computer, in some embodiments the signal is treated by software and in some embodiments displayed on a computer screen as a three dimensional point on a three dimensional grid, or similar format. The monitored actual sweet spot point moves in a triangle that represents three parameters being measured as particularly illustrated in the diagram of FIG. 3.

The software also contains an algorithm that generates a point representing optimum conditions based on the room adjusted for lights etc and the parameters being measured. In some embodiments, this point may be in a different color than a point representing the actual conditions and a deviation between the two points can be viewed. To make the two points coincide, recommended actions may be displayed at the bottom of the display screen. As these actions take effect the two points should start to move together thus showing the actual room conditions in relation to the theoretical optimum room conditions.

An exemplary algorithm may be as follows:

$$D=\sqrt{(T1-T2)^2+(V1-V2)^2+(C1-C2)^2}$$

where T1, V1, and C1 represent measured sensor values of temperature, ventilation, and CO2, and T2, V2, and C2 represent corresponding "sweet spot" parameter values for optimum human performance, and D represents the deviation from desired sweet spot.

Figure 1:
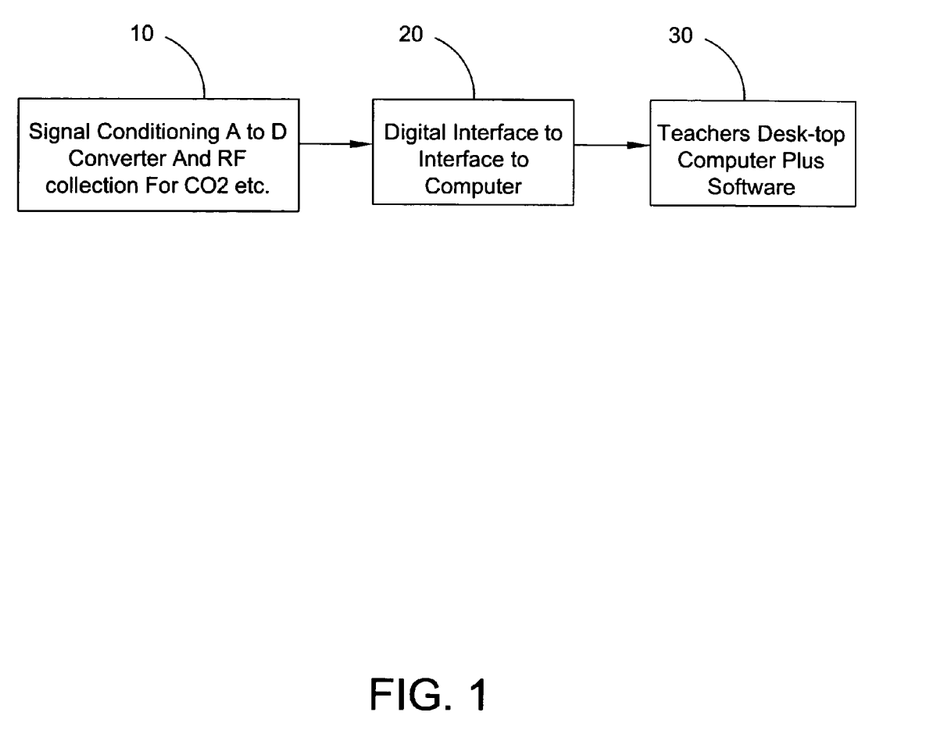
FIG. 1 is a block diagram of a system according to the present invention.

FIG. 1 illustrates a block diagram of a basic system in accordance with the present invention. Block 1 generally depicts a collection of sensor measurements associated with selected parameters, e.g., CO2. As indicated by block 10, measurements are generally applied to signal conditioning circuitry as is well known, subsequently converted to a digital signal by way of an A/D converter, and coupled to a digital interface computer indicated by block 29 by way of an RF transmission or other information signal transmission. A visual display is generally indicated by block 30 which serves as a Teacher's Desk-top Computer plus appropriate software. Of course, blocks 20 and 30 may be combined in a single entity or computer such as a laptop computer or PDA (personal digital assistant).

Figure 2:
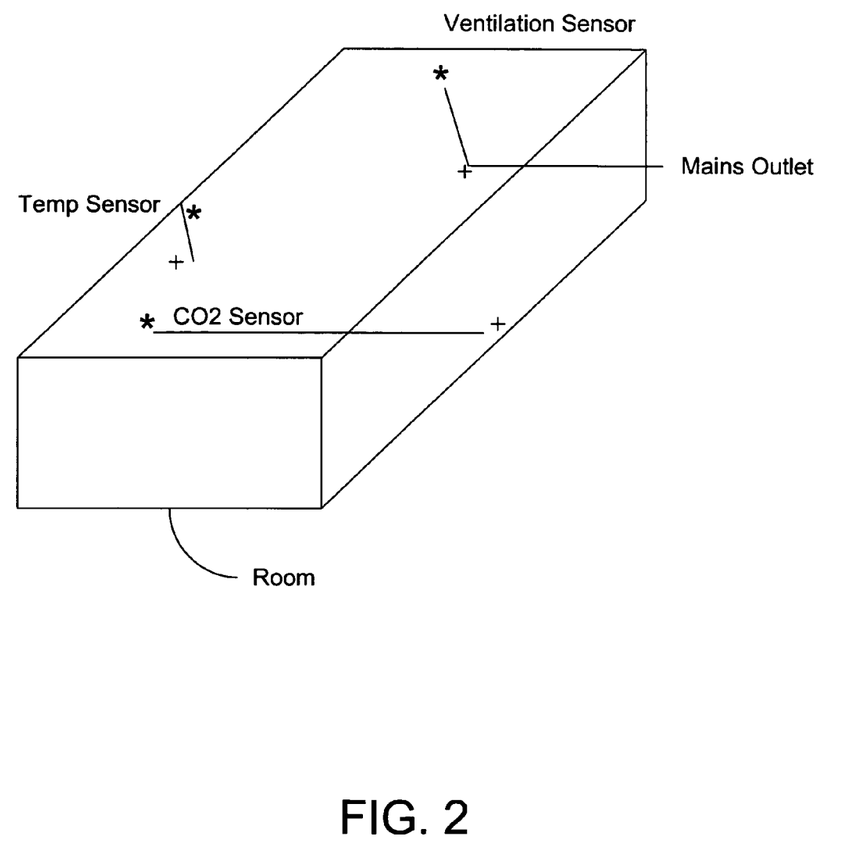
FIG. 2 is a graphical representation of a room including location of selected sensors.

FIG. 2 is a three dimensional graphical representation of a room in three dimension space and indicates exemplary locations of three environmental parameter sensors— namely, temperature, CO2, and a ventilation sensor associated with a main HVAC conditioned air outlet.

Figure 3:
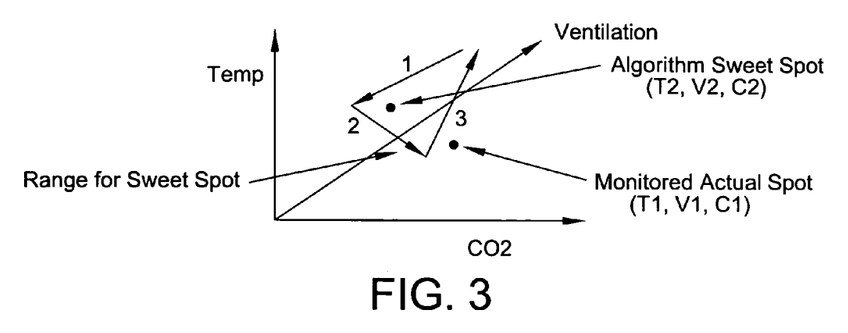
FIG. 3 is a graphical representation of a sweet spot diagram indicating actual sweet spot and a desired optimum sweet spot that may be displayed on a visual display or monitor.

FIG. 3 is a three dimensional representation of a sweet spot vector diagram that may be displayed on a teacher's display.

Figure 4A:
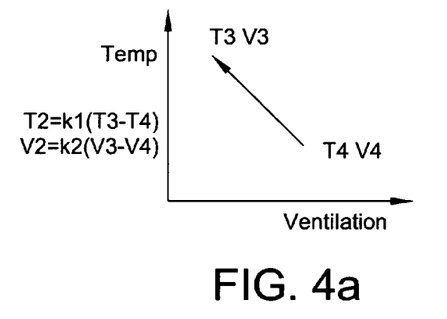
FIGS. 4a–c illustrate vector diagrams in two dimensional space that may be employed in the derivation of a sweet spot.
Figure 4B:
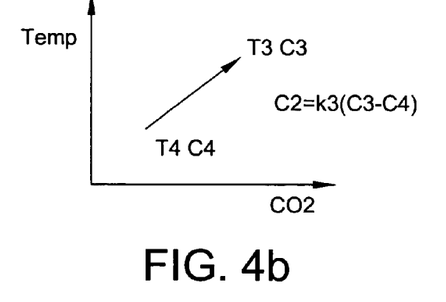
Figure 4C:
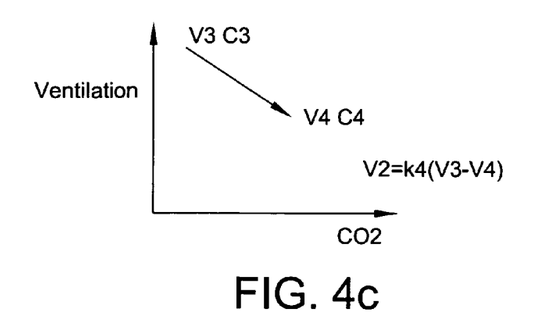

FIGS. 4a–c illustrate vector diagrams that may be used to calculate related measurements. More specifically, for example, T2 may be derived from temperature measurements at different times for refinement of the desired sweet spot value. In like manner, similar vector analysis may be utilized for calculation of other parameters like ventilation and co2, and the like, as should understood by those skilled in the art.

Figure 5:
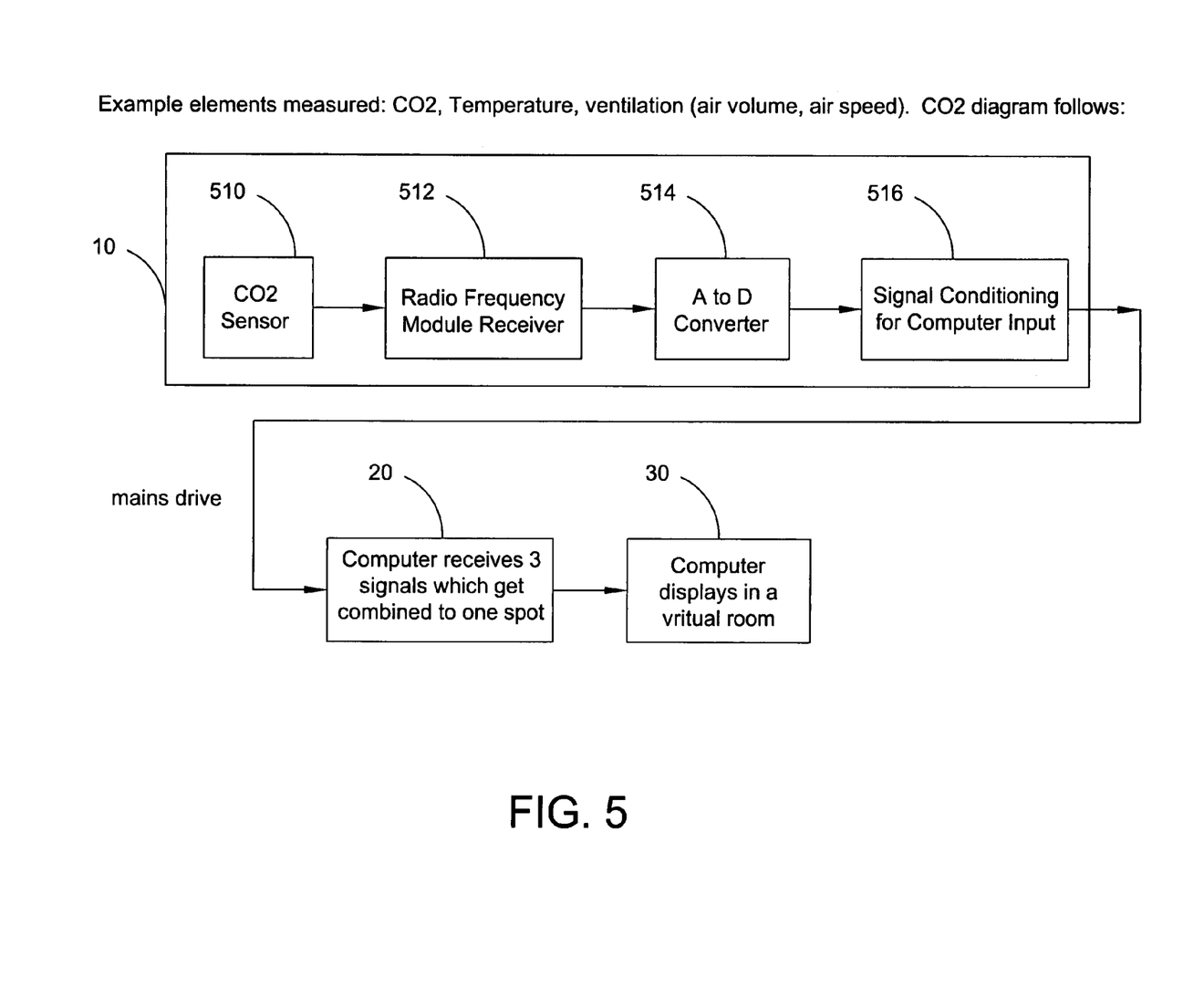
FIG. 5 is a block diagram showing further details of FIG. 1.
Figure 6:
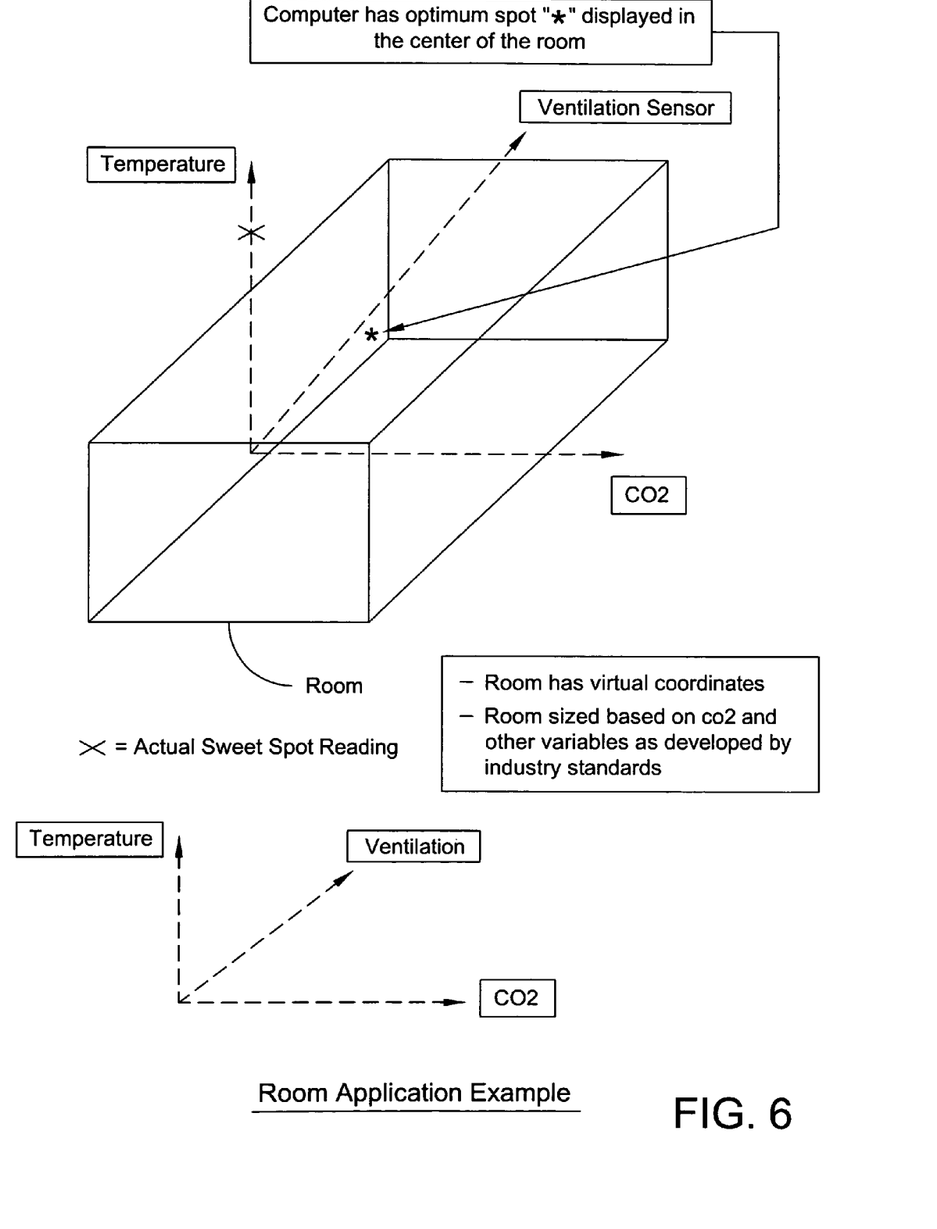
FIG. 6 is graphical representation of a visual display illustrating the virtual room and measured parameters and desired calculated optimum sweet spot for optimal human performance. The asterisk symbol indicated the desired or optimum sweet spot in three dimensional space, and the X indicated a calculate sweet spot temperature based on measured values. As illustrated the a three dimensional coordinate axis is employed where each axis defines one of three parameters, for example, temperature, CO2, and ventilation.

FIG. 5 is a more detailed diagram illustrating the system where only the CO2 measurement is indicated as block 510.

In some embodiments, a "Teaching Moment Monitor," or visual display of the present invention may be used to overcome the lack of information in typical HVAC systems, and to help the teacher respond in a real time mode to the conditions that are building up in the room. The Teaching Moment Monitor takes continuous measurements for the major parameters that can be selected for a particular room and these can be monitored and compared to an optimum value calculated from an algorithm, The deviation from the optimum level compared to the actual level can be calculated and a recommended course of action can be itemized for the teacher to follow to change the actual values closer to the optimum values. This will typically improve the conditions in the room and the concentration and performance of the class members should return to normal.

It should be noted that rooms may be used for different purposes and this will change the conditions in the room. For example a room that is filled with computers will generate a lot of heat creating a very poor atmosphere and air quality. This is because the thermostat responds to the heat and stops supplying air to the room so the ventilation decreases and CO2 raises causing stale air resulting in drowsy students. Another example could be a chemistry laboratory where the Bunsen burners are causing the temperature to rise and the thermostat cuts down the flow of air to the room with the result that the volatile organic compounds raise and the room becomes very smelly which is undetectable by the occupants, as they have become use to it. These are just some examples of how room use can change and cause quite different conditions in the room and so a very different teaching environment.

In some embodiments, a desirable way of communicating the actual readings and the optimum readings as expressed by the algorithm is by a virtual room, such as those found in computer games. The teacher would be presented with a virtual room on the screen and receive prompts that would build the details of the room. The prompts may include such things as: where is the blackboard located? Where is the teacher's desk located? How many student desks in the room? Where the windows located are and which direction do the windows face? Where the lights are located and are they on? Where are the radiators located? Where are the input heating vents located? Where is the exhaust vent located? Where is the door located? Where is the thermostat located? Where are the power sockets located? Where are the fume cupboards, Bunsen burners, computers, fridges, TV's, microwave ovens located? In some embodiments, by clicking on a mouse these items can be placed in the virtual room and the virtual room displays a representation of the teacher's room. In some embodiments, once this information is collected the system will recommend where to place the sensors for desirable results and show them in the room.

In some embodiments, information from the sensors could be displayed as actual and as a "happy face" as if it were the teacher. If cold, some symbols could be blue and frosty, and if hot, red and sweaty, and if tired, sleepy eyed. The optimum level for the room from the algorithm could be another "happy face" but all smiley and glowing.

Further, a list of recommendations may appear on the screen that could be done to bring the room closer to the optimum like open window, open door, and switch on fan and as these take effect the teacher would be shown approaching the optimum from decreasing density to increasing density.

In another embodiment or approach, the display may represent the size of the room according to the size of the vectors for the parameters as defined by ASHRAE or other recommended values (the highs and lows). These comfort tolerances levels may be selected by the teacher depending on the comfort needed—high, medium, low comfort. In some embodiments, a three dimensional axes may be displayed in the virtual room which shows where the sweet spot should be and where the actual spot is relative to the walls of the room. If the actual falls outside the room walls then clearly the comfort in the room is very low and action is needed. The teacher would receive prompts on the screen as to what action to take. As the actual sweet spot approaches the optimum sweet spot, the actual sweet spot trail in a shadow could be shown.

Note that the exemplary system described here has been presented in the context of a classroom. However, the invention is not limited to classroom settings. For example, a very similar system incorporating the embodiments of the invention could be constructed for use in a hospital operating room that monitors, displays, and records information in a database for data gathering or mining at a later date.

The principles of the present invention that may be included in various embodiments include, among others:

Real time monitoring of key environmental room variables;

Three key variables may be used to monitor the key use of the room;

Three key variables may be displayed in a three dimensional space as a sweet spot;

Three key variables combined in an algorithm that calculates a sweet spot that represents the optimum point for learning performance. This is shown at the center of a range of values;

System may be tuned to a particular room;

System may be tuned to a particular room use;

System may be seasonal sensitive;

Deviation between the actual sweet spot and the calculated by the algorithm results in actions that can be taken to return to the optimum learning performance in real time to catch the teaching moment;

System may be stand-alone, and a monitor not necessarily include a controller;

System may be room specific;

System may be independent of all other controls and monitors in a room;

System IS comprised of sensors and an algorithm that is displayed on any computer; and System can display on computer screen conditions that would lead to discomfort such as odors.

Systems and methods for monitoring conditions in a room is accordance with the present invention for improving human occupants' performance have been disclosed. Although specific embodiments have been illustrated and described herein, it will be appreciated by those of ordinary skill in the art that any management that is calculated to achieve the same purpose may be substituted for the specific embodiments shown. For example, the present invention has been described in the context of a classroom in a school. The systems and methods of the invention apply equally as well to other types of room settings, for example, an operating room in a hospital. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

I claim:

1. A method for monitoring conditions in a room, the method comprising:
   receiving a set of desirable parameters for a room; receiving a set of actual conditions for the room;
   determining a deviation of the actual conditions from the desirable conditions; and
   displaying at least one recommendation designed to bring the actual conditions closer to the desirable parameters.

2. The method of claim 1, wherein the set of desirable parameters include parameters selected from the group consisting of: temperature, CO, ventilation, Humidity, volatile organic compounds, sound, static, light, pressure and $H_2S$.

3. The method of claim 1, wherein the at least one recommendation includes a recommendation selected from the group consisting of: turn on room fan, open a window, pull down a blind, have occupants move about for a selected time, adjust thermostat, increase ventilation, move furniture away from ducts, and increase number of vents.

4. The method of claim 1, further comprising displaying a sweet spot indicator representing the desired set of parameter values and a graphical indicator representing the actual conditions.

5. The method of claim 1, wherein the room is a classroom.

6. The method of claim 1, further comprising receiving a set of configuration data for the room.

7. A computerized system for monitoring conditions in a room, the system comprising:
   a monitor
   a plurality of sensors placed in a room, wherein each of said sensors is operable to measure a selected environmental condition in the room; and
   a computer, communicably coupled to the monitor and to the plurality of sensors and operable to,
      receive a set of measurements for actual conditions from the plurality of monitors;
      display on the monitor an indicator representing the set of measurements;

display on the monitor an indicator representing a set of desirable parameters; and display on the monitor at least one recommendation designed to bring the actual conditions closer to the set of desirable parameters.

8. The system of claim 7, wherein at least a subset of the plurality of sensors is communicably coupled to the computer with a wireless interface.

9. The system of claim 7, further comprising an analog to digital converter coupled to the computer and operable to convert an analog signal received from one of the plurality of sensors to a digital format.

10. The system of claim 7, wherein the set of desirable parameters include parameters selected from the group consisting of: temperature, CO2, ventilation, humidity, volatile organic compounds, sound, static, light, pressure, and H2S.

11. The system of claim 7, wherein the at least one recommendation includes a recommendation selected from the group consisting of: turn on room fan, open a window, pull down a blind, have occupants move about for a selected time, adjust thermostat, increase ventilation, move furniture away from ducts, and increase number of vents.

12. The system of claim 7, wherein the computer is further operable to display a sweet spot indicator representing the desired set of parameter values and a graphical indicator representing the actual conditions.

13. The system of claim 7, wherein the room is a classroom.

14. The system of claim 7, wherein the computer is further operable to receive a set of configuration data for the room.

* * * * *